Nov. 7, 1961   J. W. EARLEY ET AL   3,008,047
INDUCED GAMMA ACTIVITY PROSPECTING METHOD
Filed July 23, 1956

INVENTORS
JAMES W. EARLEY
ALBERT R. GRAHAM
CHARLES W. TITTLE
BY

THEIR ATTORNEY 3,008,047
INDUCED GAMMA ACTIVITY PROSPECTING METHOD
James W. Earley, Oakmont, Pa., Charles W. Tittle, Newton, Mass., and Albert R. Graham, Toronto, Ontario, Canada, assignors to Gulf Research & Development Company, Pittsburgh, Pa., a corporation of Delaware
Filed July 23, 1956, Ser. No. 599,650
7 Claims. (Cl. 250—83)

The present invention pertains to a method of locating composition anomalies in an igneous rock structure, especially such anomalies as frequently characterize commercially valuable ore bodies, and more particularly the invention relates to locating selected types of composition anomalies by neutron-induced, gamma-ray spectrometry.

This application pertains to subject matter related to that disclosed in our similarly assigned U.S. application Serial No. 599,623, filed July 23, 1956, entitled "Neutron Capture, Gamma-Ray Prospecting Method," now U.S. Patent No. 2,983,817, issued May 9, 1961.

The invention is predicated upon the discovery that processes resulting in ore bodies in an igneous or metamorphic rock body and/or alteration processes that occur subsequent thereto frequently result in a halo zone surrounding the ore body or in the immediate vicinity thereof, such halo zone being relatively richer in either or both the commercially significant component of the ore body or relatively richer in some other constituent of the igneous or metamorphic rock body than contiguous areas of the same body; and that a number of important types of such departures from the composition norm of an igneous or metamorphic rock body (anomaly) can be determined by neutron-induced gamma-ray spectrometry.

For example, sodium concentration in a rock body is important in the delineation of some types of metasomatic haloes, since sodium is added in amounts of one to ten percent during extensive hydrothermal alteration that is often related to ore deposition.

Broadly, the method comprises procuring igneous or metamorphic rock samples of equal weight from points spaced over an area of an igneous or metamorphic rock body to be investigated, and subjecting each sample to an equal flux of slow neutrons for a set period of time sufficient to induce gamma activity therein assuming that the sample contains one or more certain classes of atomic nuclei. Thereafter, measurement is made with respect to the rate at which gamma rays are produced by the sample, and the measured rates of the various samples are then correlated with the locations of the points from which the samples were procured to establish a relationship useful in the detection of and locating of composition anomalies in the rock body.

More particularly, the measurement of gamma rays is made with respect to gamma rays of a selected energy or range of energies that correspond to the gamma rays produced upon the decay of radioisotopes formed in the sample during slow neutron irradiation thereof. Also, the gamma-ray measurement is made alternatively with respect to the average rate of gamma-ray production over a period of time following neutron irradiation of the sample, or with respect to the manner in which the rate of gamma-ray production varies with time following neutron irradiation.

In the practice of the invention, an apparatus for concurrently and uniformly subjecting a plurality of equal-weight samples to neutron irradiation in a manner efficiently utilizing available neutrons is preferred. The apparatus involves a container for maintaining a plurality of samples segregated one from the other with each sample being equidistant and subtending equal solid angles from a source of neutrons, and with the source of neutrons in the container with its contained samples being disposed generally centrally within a mass of neutron-moderating material. More specifically, the preferred apparatus also involves the mass of neutron-moderating material being solid and formed of separable portions affording efficacious access to the container and its contents.

The invention will be most readily understood in the light of the description given hereinafter of a preferred mode of practice of the invention, and the description of a preferred embodiment of apparatus useful in the practice of the invention taken together with the accompanying drawings, wherein.

The preferred mode of practicing the invention comprises procuring a plurality of surface or near surface rock samples from an igneous or metamorphic rock body, such samples being preferably procured according to a grid pattern in the manner more fully described in our previously mentioned copending application.

Figure 1:
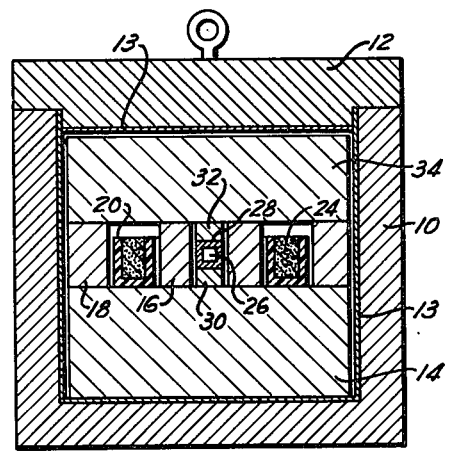
FIGURE 1 is a sectional view of apparatus suitable for inducing gamma activities in a plurality of igneous and metamorphic rock samples.
Figure 2:
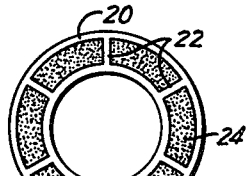
FIGURE 2 is a top view of the sample container of FIGURE 1.

Each sample is subjected to a fixed flux of slow neutrons for a set interval of time, sufficient to induce gamma activity therein. This step is preferably accomplished with respect to a plurality of samples at a single time, the apparatus shown in FIGURES 1 and 2 being especially well adapted for this purpose. Referring to FIGURES 1 and 2, the numeral 10 designates a vessel having a removable cover 12. The vessel 10 and its cover 12 are preferably but not necessarily formed of shielding material to prevent gamma rays as well as neutrons from escaping from within the vessel 10. Such shielding is well known to those skilled in the art and can conveniently comprise the vessel 10 and its cover being formed of lead provided with a lining of either boron or cadmium 13.

The lower part of the vessel 10 is filled with a solid neutron moderator 14, preferably paraffin. Spaced inner and outer, upstanding, hollow concentric cylinders 16 and 18 formed of a solid neutron moderating material, preferably paraffin, rest upon the body 14, and disposed between the spaced cylinders 16 and 18 is a toroidal-shaped sample container 20 that is formed of a substance relatively transparent to neutrons, preferably a plastic such as polymerized methyl methacrylate sold under the trademark "Lucite." As best shown in FIGURE 2, the container 20 is provided with a plurality of equally spaced, radially extending partitions 22 also preferably formed of "Lucite." The container 20 rests upon the body of neutron moderating material 14 and is adapted to contain a plurality of equal weight specimens or samples of rock, individual samples 24 of rock being separated by the partitions 22.

Disposed within the inner hollow cylinder 16 is a source of neutrons 26. The neutron source 26 can be of conventional character, such as a radium-beryllium source or a polonium-beryllium source. The neutron source 26 can be surrounded by a lead shield 28, and the source 26 and the shield 28 are interposed between small cylinders 30 and 32 of solid neutron-moderating material (preferably paraffin), the lowermost of such cylinders 30 resting upon the body of neutron moderating material 14, and with the upper surface of the cylinder 32 being coplanar with the upper surfaces of the cylinders 16 and 18. A further block or body of neutron moderator 34 is disposed within the vessel 10 and rests upon the cylinders 16, 18, and 32.

In operation, neutrons are emitted by the source 26 with such neutrons being moderated within the neutron-moderating elements 14, 16, 18, 30, 32, and 34 to become slow neutrons (epithermal and thermal neutrons, predominately having energies of less than 0.2 electron volt). It will be understood that the size of the vessel 10 is such that the elements therein composed of neutron-moderating materials are of sufficient size to accomplish the requisite degree of neutron moderation. Neutrons moderated within the elements composed of neutron-moderating material diffuse into the container 20 and into the samples 24 contained therein so as to react with constituents of the samples 24.

The samples 24 of igneous or metamorphic rock can conveniently be from one to five pounds each, and are preferably about two pounds although considerably smaller and larger samples can be used. Samples of about two pounds weight are preferred for the reason that errors stemming from any possible lack of homogeneity of the igneous or metamorphic rock are materially reduced and for the further reason that samples of this size can acquire a reasonable level of total induced gamma activity in a reasonably short period of time.

Accordingly, after the samples have been procured from spaced points over the area of the igneous or metamorphic rock body to be investigated, the samples are crushed or otherwise broken up sufficiently that equal weight samples of each can be placed within the plurality of compartments within the container 20 defined by the partitions 22.

The samples 24 are then subjected to the flux of slow neutrons provided by the structure shown in FIGURE 1 or an equivalent thereof. The concurrent irradiation of a plurality of samples is not, as will be appreciated, essential, but such an arrangement is preferred in the interest of conservation of time and equipment. The period of time that the samples are subjected to a flux of slow neutrons is such as to produce a reasonable level of gamma activity in the samples assuming the presence of an appreciable concentration of certain classes of atomic nuclei therein, and is of course dependent upon the intensity of the flux of slow neutrons and the size of the samples, as will be understood. In treating a plurality of two pound samples in apparatus such as shown in FIGURE 1, it has been found that subjecting the same to a flux of slow neutrons for a period of time of about 15 hours is sufficient where the source 26 is a 5-curie polonium-beryllium source, or one curie of radium-beryllium, where the relative concentrations of sodium and manganese is sought; however, stronger sources and/or longer times of irradiation can be necessary depending upon nature of element concerned. In any event, each sample 24 is subject to a fixed flux of slow neutrons for a set period of time.

After the set period of time in which the samples are to be subjected to the neutron flux has elapsed, one of the samples 24 is placed in a toroidal-shaped container 36 (see FIGURE 3, wherein the sample is redesignated by numeral 37), similar to, though smaller and without partitions, the container 20, such container 36 being preferably formed of "Lucite." The reference numeral 38 designates generally a photomultiplier tube, scintillation crystal combination, the position of the crystal thereof being indicated in dashed outline at 40. The photomultiplier tube and scintillation crystal combination 38 is so positioned with respect to the toroidal-shaped container 36 and the single sample 24 therein that the scintillation crystal 40 is centrally disposed of the sample 37. The scintillation crystal 40 is preferably a thallium-activated sodium iodide crystal of conventional character. Though other well known types of gamma-ray detectors giving responses such that the energies of the detected gamma rays can be discriminated between can be used, such as a proportional counter, the described scintillation type is preferred.

Figure 4:
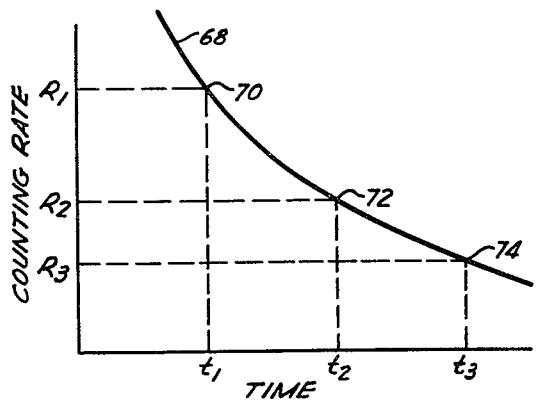
FIGURE 4 is a graph of the type that can be produced by the apparatus of FIGURE 3 and is given for the purpose of illustrating the manner of computing the relative concentration of radioisotopes.

The output of the photomultiplier tube and scintillation crystal combination 38 is fed to a conventional amplifier 44 by leads 46 and 48, with the output of the amplifier 44 being in turn fed to a conventional discriminator or pulse-height analyzer 50 by leads 52 and 54. The output of the pulse-height analyzer 50 is fed to a conventional integrating circuit or counting rate meter 56 by leads 58 and 60, and the output of the counting rate meter 56 is in turn fed to a recorder 62 by leads 64 and 66. The recorder 62 is of conventional character and is preferably the type that records the signal fed thereto from the counting rate meter 56 versus time, so that a graphical representation of counting rate versus time such as that shown in FIGURE 4 is obtained.

Figure 3:
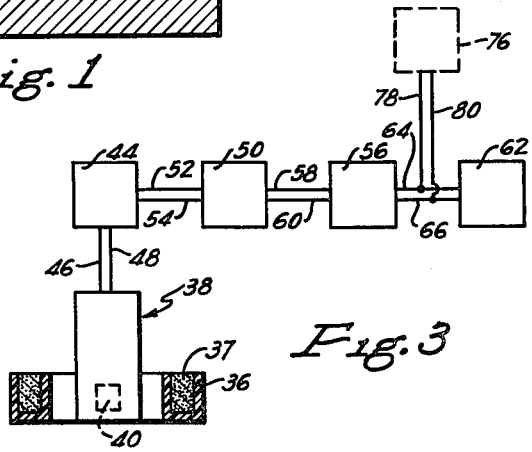
FIGURE 3 is a diagrammatic view of apparatus for measuring the rates and energies of gamma rays produced by a sample having an induced gamma activity.

The operation of the apparatus shown in FIGURE 3 is such that gamma rays produced by the sample 42 are detected by the photomultiplier tube and scintillation crystal combination 38 with such combination producing electrical pulses having heights dependent upon the energies of the individual gamma rays detected. The pulses produced by the photomultiplier tube and scintillation crystal combination 38 are amplified by the amplifier 44 and passed to the pulse-height analyzer 50. The pulse-height analyzer 50 is conventional in character and is adjusted to pass solely pulses of a selected height or selected range of heights to the counting rate meter 56.

The principles determinative of the selective adjustment to be made with respect to the pulse-height analyzer 50 are described subsequently.

The integrating circuit or counting rate meter 56 is conventional in character and produces an electrical signal having a magnitude that is at least linear and preferably proportional to the frequency at which pulses are received thereby from the pulse-height analyzer 50. The electrical signal effected by the counting rate meter 56 is recorded versus time by the conventional recorder 62 so as to effect a graph of counting rate versus time such as that shown in FIGURE 4 as previously mentioned.

Means, not shown, of conventional character is provided for energizing the photomultiplier tube and scintillation crystal combination 38, the amplifier 34, the pulse height analyzer 50, the counting rate meter 56, and the recorder 62, as will be appreciated by those skilled in the art.

As is well known, a large number of classes of atomic nuclei react with slow neutrons by a process known as neutron capture to yield gamma-active radioisotopes. Each individual radioisotope disintegrates with a characteristic half-life and in such disintegration or in fixed percentages of such disintegrations produces gamma rays of one or more characteristic energies.

The following table, though not exhaustive, lists a number of classes of atomic nuclei that capture slow neutrons to yield gamma-active radioisotopes. The table also includes the percentage of the naturally occurring element that comprise each of the listed classes of atomic nuclei, the radioisotope produced, the half-life of such radioisotope, and the energy of the gamma rays produced upon disintegraton of the radioisotope, as well as the percentage of disintegrations producing the particular gamma ray.

TABLE

*Slow neutron-capture reactions producing gamma-emitting radioisotopes*

| Element | Mass Number | Percent Relative Isotope Abundance | Radio-Isotope Produced | Half Life | Energy of Gamma Ray, mev. | Percent of Disintegrations Producing γ-ray |
|---|---|---|---|---|---|---|
| Aluminum | 27 | 100 | $Al^{28}$ | 2.4 min | 1.8 | 100 |
| Chlorine | 37 | 24.6 | $Cl^{38}$ | 37.5 min | 1.6 | 31 |
|  |  |  |  |  | 2.15 | 47 |
| Sodium | 23 | 100 | $Na^{24}$ | 15 hr | 2.75 | 100 |
|  |  |  |  |  | 1.38 | 100 |
| Magnesium | 26 | 11.29 | $Mg^{27}$ | 10 min | 1.01 | 20 |
|  |  |  |  |  | 0.84 | 100 |
| Potassium | 41 | 6.7 | $K^{42}$ | 12.4 hr | 1.51 | 20 |
| Titanium | 50 | 5.34 | $Ti^{51}$ | 5.8 min | 0.32 | ? |
| Vanadium | 51 | 100 | $V^{52}$ | 3.7 min | 1.45 | ? |
| Manganese | 55 | 100 | $Mn^{56}$ | 2.6 hr | 0.82 others | 100 |
| Cobalt | 59 | 100 | $Co^{60m}$ | 10 min | 0.06 | 99 |
|  |  |  | $Co^{60}$ | 5.3 yr | 1.17 | 100 |
|  |  |  |  |  | 1.33 | 100 |
| Nickel | 64 | 1.16 | $Ni^{65}$ | 2.6 hr | 1.49 | 15 |
|  |  |  |  |  | 1.12 | 14 |
|  |  |  |  |  | 0.37 | 15 |
| Copper | 63 | 69.09 | $Cu^{64}$ | 13 hr | 1.34 | 0.5 |
| Copper | 65 | 30.91 | $Cu^{66}$ | 5.2 min | 1.04 | 7 |
| Rhodium | 103 | 100 | $Rh^{104}$ | 44 sec | 0.04 | ? |
|  |  |  |  |  | 0.18 | ? |
|  |  |  |  |  | 0.95 | ? |
| Indium | 115 | 95.77 | $In^{116}$ | 54 min | various |  |
| Iodine | 127 | 100 | $I^{128}$ | 25 min | 0.43 | 7 |
| Barium | 138 | 71.66 | $Ba^{139}$ | 85 min | 0.16 | 26 |
| Dysprosium | 164 | 28.18 | $Dy^{165m}$ | 1.25 min | 0.11 | ? |
|  |  |  | $Dy^{165}$ | 140 min | various |  |
| Tungsten | 186 | 29.17 | $W^{187}$ | 24 hr | various |  |
| Gold | 197 | 100 | $Au^{198}$ | 2.7 days | 0.411 | 99 |

If the samples 24 of rock irradiated by slow neutrons with the apparatus shown in FIGURE 1 or an equivalent thereof contains any one of the classes of atomic nuclei listed in the foregoing table, or for that matter any class of atomic nuclei that captures slow neutrons to yield a gamma active radioisotope, the corresponding radioisotope will be produced, with the amount of the radioisotope produced in the sample being dependent upon the intensity of the flux of slow neutrons in the sample, the cross section of the particular class of atomic nuclei concerned for capturing slow neutrons, the concentration of the class atomic nuclei in the sample, the size of the sample, and the period of time that the sample is subjected to the flux of slow neutrons. While the intensity of the flux of slow neutrons to which the sample is subjected is fixed upon the selection of the components of the apparatus shown in FIGURE 1 or its equivalent, it will be noted that the flux of slow neutrons within the sample can be reduced by the presence of substances therein having high cross sections for slow neutrons, lithium, boron, and cadmium being especially noteworthy examples of such types of substances. Reference will be made subsequently to the consequences of such reduction of neutron flux within a sample, and to a procedure that can optionally be employed to compensate in large measure for such reduction. Except for the possible influence of this latter factor, the concentration of the class of atomic nuclei is the only unknown factor determinative of the amount of the radioisotope produced.

Inasmuch as the amount of each radioisotope produced in a sample subjected to the flux of slow neutrons is a function of the concentration of the class of atomic nuclei from which the same was produced within the sample, measurement of the amount of any one of the radioisotopes produced makes determinable the concentration of the class of atomic nuclei productive of such radioisotope, assuming that the slow neutron flux within the sample is known. Knowledge of the concentration of the particular class of atomic nuclei productive of the radioisotope in turn makes it possible to ascertain the amount concentration of the naturally occurring element of which the particular class of atomic nuclei is an isotope, as such isotope occurs as a known or determinable percentage of all the nuclei of the naturally occurring element.

For the purposes of the present invention, it is not necessary to know precisely the concentrations of either the radioisotopes or the elements from which they are derived by neutron-capture processes, it being only necessary that the relative concentrations of a particular element or class of atomic nuclei can be ascertained roughly with respect to a plurality of igneous or metamorphic rock samples.

The relative concentrations of a particular element or class of atomic nuclei can be ascertained upon inspection of the records produced by the recorder 62 with respect to the plurality of samples, with the selection of the particular element or class of atomic nuclei being accomplished by appropriate selection as to the pulse heights that the pulse height analyzer 50 is adjusted to pass.

For example, should the relative concentration of sodium in the various samples be desired, the pulse height analyzer 50 can be adjusted to pass only pulses having heights corresponding to detected gamma rays having about 2.75 mev. and/or about 1.38 mev. energies. With this arrangement, the recorder 62 will produce a graph in which the recorded counting rate will vary with time in a manner essentially proportional solely to the manner in which the concentration of the radioisotope $_{23}Na^{24}$ in the sample varies with time. Knowing the value of such counting rate or the relatively short interval average value of such rate at any particular time after the sample has been irradiated with slow neutrons, or the integrated value of such rate over a set period of time, gives a relative measure of the concentration of naturally occurring sodium nuclei within the sample, as will be appreciated by those skilled in the art. For example, comparison of such counting rates for a plurality of samples, say five minutes after cessation of neutron irradiation is at least a rough measure of the relative concentrations of sodium nuclei in the various samples. Such measured rates which are for practical purposes roughly measured relative concentrations of sodium can be then correlated with the locations from which the rock samples from the igneous or metamorphic rock body were procured.

Such correlation can be accomplished by mere inspection of the measured rates or concentrations, but is preferably obtained by plotting such measured rates or relative concentrations upon a map corresponding to the area of the igneous or metamorphic rock body under investigation with the optional additional step of marking upon the map isograms of sufficiently close interval values so as to delineate anomalies in the rock body with special reference to sodium. As mentioned previously anomalies in the concentration of sodium can be of vast interpretive importance in the delineation of some types of metasomatic haloes in igneous or metamorphic rocks that frequently related to the deposition of ore bodies.

If desired, either the actual or relative concentrations of sodium within the samples can be computed with reasonable accuracy by taking into consideration the fundamental equation of radioactive decay:

$$N_t = N_0 e^{\lambda t}$$

where:

$N_0$=number of nuclei at zero time,
$N_t$=number of nuclei remaining after elapse of $t$ time, and
$\lambda$=decay constant The measured rate at a particular time can then be related to actual or relative sodium concentration approximately by calibration of results in relation to results obtained with a sample of known sodium concentration.

The decay constants of various radioisotopes is available in the literature; however, for the radioisotopes in the table, such constants can be readily calculated from the listed half-lives by the relation:

$$\lambda = \frac{0.693}{L}$$

where L is the half life, and $\lambda$ is the decay constant.

Thus, $\lambda$ equals 0.693/15 equals 0.0462 reciprocal hour for $_{23}Na^{24}$.

In ascertaining with greater precision, as an optional step, the actual or relative concentration of sodium in the various samples prior to correlation, a correction factor allowing for the presence of substances within the samples having relatively high cross sections for slow neutrons can be obtained with respect to each sample by measuring the relative transparencies or relative total cross sections of the samples to slow neutrons by methods known to the art, as will be understood by those skilled in this field. Such relative transparency or relative total cross sections of the samples to slow neutrons will give a measure of the extent to which the slow neutron flux within the samples varies from sample to sample and allow appropriate revision of the measured rates, as determined empirically be measuring the effect of including known amounts of a strong neutron absorber, such as boron, in samples of known composition.

The hereinabove described method of measuring either the actual or relative concentrations of sodium in the various samples can be applied in a perfectly analogous manner, either with applying the corrections of the preceding paragraph, to other classes of nuclei or elements, such as for example any of the elements named in the table, assuming a sufficiently strong flux of slow neutrons available. Considered of particular interpretive importance and/or suitability in the practice of the invention are the naturally occurring elements sodium, manganese, chlorine, aluminum and magnesium, the results being made generally specific with respect to any of the elements by appropriate adjustment of the pulse height analyzer 50. For example, where it is desired that the method produce results generally specific with respect to aluminum the pulse height analyzer 50 is adjusted to pass substantially solely only pulses having heights corresponding to detected gamma rays of about 1.8 mev. It is recognized that the production of the radioisotope $Al^{28}$ by a different process, viz, the reaction $Si^{28}(n,p)Al^{28}$ due to fast neutrons, can interfere with the determination of aluminum by the described method. A correction for this effect can be made if deemed necessary or advisable by irradiating the sample with fast neutrons only (i.e., with an arrangement similar to that of FIGURE 1 but with the moderator removed) and applying an empirically determined factor to the measured $Al^{28}$ activity to allow for the attenuation of the fast neutrons in the original measurement. Such a procedure need not be used in the practice of the invention, since in the majority of instances, an increase in aluminum content will be accompanied by a decrease in silicon content; but the reduction of $Al^{28}$ activity due to the decrease in silicon content will be outweighed by the increase due to the increase in aluminum content. Thus, in most cases a higher $Al^{28}$ activity will correspond to a relatively larger aluminum content, but the relation will not be strictly quantitative. Where the method is to be applied to the chlorine, the pulse height analyzer 50 is adjusted to pass substantially solely only pulses having heights corresponding to detected gamma rays having energies about either or both 1.6 and 2.15 mev. For magnesium, the pulse height analyzer 50 is adjusted to pass pulse heights corresponding to detected gamma rays having energies of either or both about 1.01 and 0.84 mev. Similarly with respect to manganese, the pulse height analyzer 50 is adjusted to pass pulses having heights corresponding solely to detected gamma rays of 0.82 mev.

Occasionally, it may be that appreciable amounts of more than one radioisotope can occur in a sample productive of gamma rays of the same or about the same energies. Delineation between the plurality of radioisotopes can be accomplished by selecting a different valued gamma ray characteristic of the radioisotope with respect to which specific information is desired, and where this is not feasible, the counting rate curve produced by the recorder 62 can be mathematically evaluated either by an electrical computer or by simple computations of mechanical nature to delineate one from another of the radioisotopes represented in the counting rate. Delineation of radioisotopes according to the latter procedure is of mechanical nature not requiring the mental faculty of judgment and is common practice in the art; however, the following explanation of the manner by which such delineation can be accomplished may be of interest.

In the graph shown in FIGURE 4, the curve 68 is a decay curve such as recorded by the recorder 62, such curve 68 specifically indicating the manner in which counting rate of gamma rays of a particular energy level varies with time. Assuming that the particular gamma ray is produced upon the decay of a plurality of radioisotopes, the curve 68 represents the summation with respect to time of the rates at which all of the radioisotopes are producing the particular energy level gamma ray.

The rate at which a particular radioisotope produces a gamma ray of a particular energy can be represented by the equation:

$$R = kCe^{-\lambda t}$$

where:

$R$=Counting rate
$C$=Initial radioisotope concentration
$\lambda$=Decay constant
$t$=Time
$k$=Proportionality constant having a value dependent upon unique characteristics of the radioisotope, such as percentage of disintegrations producing the gamma ray, etc.

Accordingly, the total counting rate due to a plurality of radioisotopes, say for example three radioisotopes can be represented by the following equation where the subscripts 1, 2 and 3 designate values pertaining to particular radioisotopes:

$$R(\text{total}) = k_1 C_1 e^{-\lambda_1 t} + k_2 C_2 e^{-\lambda_2 t} + k_3 C_3 e^{-\lambda_3 t}$$

Inspection of the above equation makes it apparent that a linear equation with respect to the concentrations of the various isotopes can be obtained upon each measurement of the total counting rate at a particular time. Thus, measurement of the total counting rate at as many different times as there are radioisotopes assumed to be present in sufficiently appreciable concentrations to contribute materially to the total counting rate will make possible a sufficient number of linear equations from which the relative concentration of any one or all of the radioisotopes can be readily computed. For example, with respect to FIGURE 4 where it is assumed that the curve 68 represents counting rates contributed to by three radioisotopes, the counting rate values $R_1$, $R_2$, and $R_3$ and the time values $t_1$, $t_2$, and $t_3$ associated respectively with the points 70, 72 and 74 on the curve 68 can be substituted in the above equation to obtain the following set of three linear equations for the three unknowns, $C_1$, $C_2$, and $C_3$.

$$R_1 = k_1 C_1 e^{-\lambda_1 t_1} + k_2 C_2 e^{-\lambda_2 t_1} + k_3 C_3 e^{-\lambda_3 t_1}$$
$$R_2 = k_1 C_1 e^{-\lambda_1 t_2} + k_2 C_2 e^{-\lambda_2 t_2} + k_3 C_3 e^{-\lambda_3 t_2}$$
$$R_3 = k_1 C_1 e^{-\lambda_1 t_3} + k_2 C_2 e^{-\lambda_2 t_3} + k_3 C_3 e^{-\lambda_3 t_3}$$

Inspection of the above set of linear equations makes it apparent that any one or all of the values of $C_1$, $C_2$, and $C_3$ can be readily computed. Rather than making computations of the type indicated above, it is within the purview of the invention that the output of the counting rate meter 56 can be fed to 76 a digital or analogue computer indicated in dashed outline at 76 by leads 78 and 80. The computer 76 includes means for translating periodically timed values of the signals received from the counting rate meter 56 into the parameters R and $t$ of the equations given above and has "instructions," as will be understood by those skilled in the computer art to solve such equations for the concentration of any one or all of the radioisotopes contributing to the gamma rays that result in pulses having heights passed by the pulse height analyzer 50, for subsequent correlation of the solutions made with respect to the various samples with the locations from which the samples were procured.

The above described procedure assumes a prior knowledge of the decay constants $\lambda_1$, $\lambda_2$, $\lambda_3$ of the radioisotopes likely to be present in concentrations sufficient to give measurable counting rates of gamma rays in the energy range under consideration. If such is not the case, an alternative procedure can be adopted, in which the counting rate is plotted on a logarithmic scale against time, and the resulting curve is resolved into its linear components by a procedure well known in the art.

From the foregoing it will be seen that at least relative concentration data with respect to a selected one of a plurality of elements in the various samples can be obtained from the record produced by the recorder 62 in many instances, and otherwise can be obtained by simple computational steps of a definitely prescribed character that do not require the exercise of judgment or alternatively, it is possible that computers of an electrical nature can measure the desired values as explained previously. Such relative concentrations data are then correlated with the locations from which the samples were procured. Such correlation is of interpretive value in prospecting for ore bodies.

Where correction for reduction of neutron flux within the samples is not made, such lack of correction can lead to misleading information relative to the selected element; however, this is not by any means a result without a compensating virtue. A localized enrichment of say lithium, cadmium or boron which would result in such misleading results in most instances would appear on correlation as a negative anomaly. Such a negative anomaly can be of interpretive value as indicating an igneous or metamorphic rock alteration perhaps associated with an ore deposit.

It is evident that the hereinbefore described preferred modes of and apparatus for practicing the principles of the invention are susceptible to numerous changes and variations without departing from within the scope of the invention. For example many equivalents for the apparatus shown in FIGURE 3 will occur to those skilled in the art, such as the detector and recording means shown in application Serial No. 440,956 entitled "Logging of Energy Distribution," filed December 29, 1952, by C. W. Tittle, now U.S. Patent No. 2,724,977, issued November 29, 1955, with the film being driven by a clock. Accordingly reference should be made to the appended claims to determine the actual scope of the invention.

We claim:

1. A method for detecting and locating composition anomalies in an igneous or metamorphic rock body comprising procuring rock samples of equal weight from points spaced over an area to be investigated, subjecting each sample to an equal flux of slow neutrons for a set period of time, a fixed interval of time thereafter measuring the average rate at which gamma rays having a selected range of energies are produced by the sample, and correlating the measured rates of the various samples with the locations of the points from which the samples were procured to establish a relationship useful in the detecting of and locating of composition anomalies in the rock body.

2. A method for detecting and locating composition anomalies in an igneous or metamorphic rock body comprising procuring rock samples of equal weight from points spaced over an area to be investigated, subjecting each sample to an equal flux of slow neutrons for a set period of time, a fixed time thereafter making an integral count over a set interval of time of gamma rays having a selected range of energies produced by the sample, and correlating the integral counts of the various samples with the location of the points from which the samples were procured to establish a relationship useful in the detecting of and the locating of composition anomalies in the rock body.

3. A method for detecting and locating concentration anomalies in an igneous or metamorphic rock body of a class of atomic nuclei reactive with slow neutrons to produce by neutron-capture a radioisotope that in its disintegration produces gamma rays of a characteristic energy level comprising procuring rock samples of equal weight from points spaced over an area to be investigated, subjecting each sample to an equal flux of slow neutrons for a set period of time, a fixed interval of time thereafter measuring the average rate at which gamma rays of said energy level are produced by the sample, and correlating the measured rates of the various samples with the location of the points from which the samples were procured by plotting the rates upon a map representing the area under investigation and marking isograms upon the map of different valued rates to establish a relationship useful in the detecting of and locating of concentration anomalies of said class of atomic nuclei in the rock body.

4. A method for detecting and locating concentration anomalies in an igneous or metamorphic rock body of a class of atomic nuclei reactive with slow neutrons to produce by neutron-capture a radioisotope that in its disintegration produces gamma rays of a characteristic energy level comprising procuring rock samples of equal weight from points spaced over an area to be investigated, subjecting each sample to an equal flux of slow neutrons for a set period of time, a fixed time thereafter making a count over a set interval of time of gamma rays produced by the sample having said energy level, and correlating the counts of the various samples with the location of the points from which the samples were procured to establish a relationship useful in the detecting of and locating of concentration anomalies of said class of atomic nuclei in the rock body.

5. A method for detecting and locating concentration anomalies in an igneous or metamorphic rock body of nuclei selected from the group consisting of $_{11}Na^{23}$, $_{12}Mg^{26}$, $_{13}Al^{27}$, $_{17}Cl^{37}$, and $_{25}Mn^{55}$ comprising procuring rock samples of equal weight from points spaced over an area to be investigated, subjecting each sample to an equal flux of slow neutrons for a set period of time, a fixed interval of time thereafter measuring the average rate at which gamma rays of about an energy level selected from the group of energy levels consisting of 2.75 mev., 1.38 mev., 1.01 mev., 0.84 mev., 1.8 mev., 1.6 mev., 2.15 mev., and 0.82 mev. are produced by the sample, and correlating the measured rates of the various samples with the location of the points from which the samples were procured to establish a relationship useful in the detecting of and locating of concentration anomalies of the selected nuclei.

6. A method of prospecting for ore bodies in an igneous or metamorphic rock body comprising procuring a plurality of rock samples of equal weight from points spaced over an area to be investigated, subjecting each sample to an equal flux of slow neutrons for a fixed period of time sufficient to induce gamma activity therein, thereafter producing a gamma-ray decay curve of a selected energy component of the induced gamma activity, and correlating the decay curves of the various samples with the location of the points from which the samples were procured to establish a relationship useful in locating ore bodies.

7. A method of prospecting for ore bodies in an igneous or metamorphic rock body comprising procuring a plurality of rock samples of equal weight from points spaced over an area to be investigated, subjecting each sample to an equal flux of slow neutrons for a fixed period of time sufficient to induce gamma activity therein, thereafter making a plurality of measurements with respect to elapsed time of the rate at which gamma rays of a selected energy level component of the induced gamma activity are produced by the sample, and correlating the rates measured with respect to the various samples with the location of the points from which the samples were procured to establish a relationship useful in locating ore bodies.

References Cited in the file of this patent

UNITED STATES PATENTS

| | | |
|---|---|---|
| 2,206,634 | Fermi et al. | July 2, 1940 |
| 2,230,618 | Kallmann et al. | Feb. 4, 1941 |
| 2,303,688 | Fearon | Dec. 1, 1942 |
| 2,394,703 | Lipson | Feb. 12, 1946 |
| 2,551,449 | Menke | May 1, 1951 |
| 2,581,412 | Herzog | Jan. 8, 1952 |
| 2,583,288 | Arps | Jan. 22, 1952 |
| 2,675,480 | Herzog | Apr. 13, 1954 |
| 2,742,575 | Bray | Apr. 17, 1956 |
| 2,744,199 | Juterbock et al. | May 1, 1956 |
| 2,751,506 | Black et al. | June 19, 1956 |
| 2,773,991 | Bray | Dec. 11, 1956 |
| 2,775,710 | Ludeman | Dec. 25, 1956 |
| 2,781,453 | Belcher | Feb. 12, 1957 |
| 2,840,717 | de Witte | June 24, 1958 |
| 2,841,713 | Howard | July 1, 1958 |

FOREIGN PATENTS

| | | |
|---|---|---|
| 485,339 | Canada | July 29, 1952 |
| 724,441 | Great Britain | Feb. 23, 1955 |

OTHER REFERENCES

Radioisotopes in Industry, edited by J. R. Bradford, published by Reinhold Publishing Corp., copyright 1953, pp. 169–174.